United States Patent Office 3,278,433
Patented Oct. 11, 1966

3,278,433
LUBRICANTS CONTAINING POLYMERIC
ADDITIVES
I-Ming Feng, Kenilworth, N.J., assignor to Esso Research
and Engineering Company, a corporation of Delaware
No Drawing. Filed Feb. 21, 1963, Ser. No. 260,305
7 Claims. (Cl. 252—48.4)

This invention relates to polymeric materials formed by reacting halogenated polymers with diols, dithiols and hydroxy thiols. The invention also relates to methods for forming said polymeric materials and their use in oil.

DISCOVERY

It has now been discovered that halogenated polymers, e.g., chlorinated polybutene, can be reacted with various diols, dithiols, and hydroxy thiols, e.g., glycol dimercapto acetate, to form novel polymeric materials which are particularly useful as lubricating oil additives having anti-wear and extreme pressure properties. Additionally, some of these polymeric materials can be used as adhesives, etc. As lubricating oil additives, they may be added to various lubricating oils including mineral lubricating oils, synthetic lubricating oils such as phosphate esters, polyalkylene glycols, dibasic acid esters, chlorofluorocarbons, silicones, silanes, silicate esters, fluoro esters, neopentyl polyol esters, polyphenyl ethers, mixtures of these oils, etc. The polymeric materials of the present invention may be added to the various carrier mediums by mechanically mixing the two materials together under ambient conditions. If desired, the carrier medium, e.g., mineral oil, may be heated to facilitate such addition.

PREPARATION OF THE POLYMERIC MATERIALS

The polymeric materials of the present invention are prepared by reacting diols, dithiols, and hydroxy thiols with halogenated polymers. Generally, from 0.01 to 1.4 or more moles of the diol, dithiol, or hydroxy thiol will be employed per mole of halogenated polymer. Preferably, from about 0.05 to 1.2, e.g., 0.1 to 1.1 moles of diol, dithiol, or hydroxy thiol will be employed per mole of halogenated polymer.

The reaction is preferably, but not necessarily, carried out in the presence of a diluent as later described. The diluent serves to reduce the viscosity of the reaction mixture and minimize frothing. Generally, the amount of diluent used will range from 0.1 to 4, e.g., 0.2 to 2.5 parts by weight per 1 part by weight of halogenated polymer. Preferably from about 0.5 to 2 parts by weight of the diluent will be used. This diluent can be the same diluent used during the halogenation of the polymer and need not be removed at the end of the halogenation. The reaction will usually be accomplished at temperatures in the range of 25 to 250° C., preferably from 40 to 225° C., for a time of from 0.1 to 8 hours or more, e.g., 1 to 6 hours. Usually atmospheric pressures will be employed, although sub-atmospheric and super-atmospheric pressures may, at times, be employed to advantage. The reaction is not characterized by any consistent, visible phenomenon.

THE HALOGENATED POLYMERS

The halogenated polymers used in the present invention include the halogenated forms of oil soluble (e.g., soluble in mineral lubricating oil) polymers which are conventionally used as lubricating oil additives. The non-halogenated polymers, per se, are generally useful in lubricating compositions to improve the viscosity index, for thickening, as pour-point depressants, for detergency, etc. Generally, the homopolymers have one desirable property (in addition to the thickening characteristic), the copolymers have two desirable properties, and the terpolymers have three desirable properties. The halogenated forms of the various polymers have also been used as lubricating oil additives. By reacting the halogenated polymers with the diols, dithiols, and hydroxy thiols of the present invention, it is possible to create new polymeric materials which, when used as lubricating oil additives, have attractive anti-wear and extreme pressure properties.

The polymers which can be halogenated may be homopolymers; that is, polymers consisting of a single constituent monomer, or they may be copolymers consisting of two or more constituent monomers. These polymers may be prepared by conventional polymerization or copolymerization techniques which are well known in the art.

The non-halogenated polymers useful in the present invention include oil soluble homopolymers and copolymers formed from $C_2$ to $C_{30}$ olefins and $C_4$ to $C_{30}$ ethylenically mono-unsaturated esters. The molecular weight of these polymers may range from about 100 to 500,000 generally 300 to 60,000, e.g. 400 to 1500. Unless otherwise noted, all molecular weights shown with reference to the polymers are Staudinger molecular weights.

The homopolymers are exemplified by the following:

Polymers of monoolefins which may be aliphatic or have an aromatic substituent, e.g., ethylene, propylene, isobutylene, alkyl styrene, etc.

Polymers of diolefins, e.g., butadiene, isoprene, etc.

Polymers of esters of acrylic and of methacrylic acids, e.g., decyl acrylate, lauryl methacrylate, mixed $C_8$ to $C_{18}$ methacrylates, etc.

Polymers of vinyl esters, e.g., vinyl 2-ethylhexoate, the vinyl ester of coconut acids, the vinyl esters of $C_{10}$ Oxo acids made by the oxonation of tripropylene, etc.

Polymers of vinyl ethers, e.g., vinyl isobutyl ether, vinyl decyl ether, the vinyl ether of $C_8$ Oxo alcohol made by the oxonation of $C_8$ monoolefin (propylene-butylene copolymer), etc.

Polymers of esters of $\alpha,\beta$-unsaturated dicarboxylic acids, e.g., octyl fumarate, lauryl maleate, the aconitate and itaconate esters of mixed alcohols obtained by the hydrogenation of coconut oil acids, etc.

The copolymers are exemplified by the following:

Copolymers of various olefins, e.g., ethylene and propylene; isobutylene and styrene; butadiene and isobutylene; butadiene and methyl styrene; etc.

Copolymers of olefins and unsaturated esters, e.g., isobutylene and ethyl fumarate; octadecene and lauryl maleate; styrene and tetradecyl fumarate; etc.

Copolymers of various esters of unsaturated acids, e.g., ethyl methacrylate and octyl fumarate; methyl acrylate and dodecyl maleate; octadecyl fumarate and octyl aconitate; methyl methacrylate and stearyl itaconate; isopropenyl acetate and tetradecylacrylate, etc.

Copolymers of vinyl esters and unsaturated acid esters, e.g., vinyl acetate and fumarate esters of tallow alcohols; vinyl 2-ethyl butyrate and isodecyl maleate; isopropenyl acetate and the itaconic esters of coconut alcohols; etc.

Copolymers of three or more monomers, e.g., the terpolymer of vinyl acetate, octyl fumarate and maleic anhydride, etc.

The preferred polymers for use according to the present invention include polybutene and its derivatives, e.g., phosphosulfurized polybutene, i.e., treated with $P_2S_5$, and ethoxylated, hydrolyzed, phosphosulfurized polybutene. The polybutene will generally have a molecular weight (Staudinger) of from 200 to 25,000, preferably 300 to 10,000, e.g., 400 to 1200.

The halogenation of these polymers may be accomplished by contacting the polymer with a halogenating agent such as solid halogen, e.g., iodine crystals, or an inter-halogen, e.g., iodine monochloride; by dissolving the halogenating agent, e.g., iodine crystals, in a solvent to form a solution and treating the polymer with said solution; or by bubbling halogen vapor, e.g., fluorine gas, through the polymer. The temperatures of treatment will usually range from 20° to 200° F. and last from 0.1 to 72 hours, e.g., 2 to 15 hours. Suitable diluents for use during halogenation reaction include, in general, any diluent which will not react with the polymer or the halogenating agent employed and one which can readily be removed from the polymer (if desired) after the halogenation treatment is completed. These diluents can generally be characterized as having a specific gravity of from 0.5 to 1.8 and a boiling point of from 30 to 250° F. Suitable diluents include carbon tetrachloride, mineral oils, etc. The purpose of the diluent is to reduce the viscosity of the polymers during the halogenation. The amount of halogen incorporated into the polymer will generally be from 1 to 70 wt. percent or more and usually from about 2 to 50 wt. percent, e.g., 10 to 35 wt. percent. By the term "halogenated polymer" it is meant to include polymers containing chlorine, fluorine, bromine and iodine, as well as mixtures thereof.

THE DIOL, DITHIOL, AND HYDROXY THIOL COMPOUNDS

The diols, dithiols, and hydroxy thiols of the present invention can be characterized by the following generalized formula:

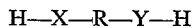

H—X—R—Y—H wherein X and Y each represent a member selected from the group consisting of sulfur and oxygen (X and Y may be the same or different) and wherein R represents an inert group of atoms (inert only as pertains to this reaction) which can be aliphatic, naphthenic (cycloalkylene), alkylene, arylene, etc., saturated or unsaturated, and may be substituted or unsubstituted, e.g., R may include ester linkages, etc. R will generally contain from 2 to 60 or more atoms, e.g., $-(C_{16}H_{32})-$. Particularly preferred are those containing from 2 to 40, e.g., 4 to 30 atoms. More preferably, those compounds which are employed are those having the hydroxy and thio groups in the alpha and omega positions. Suitable compounds include ethylene glycol, 1-thioglycerol, a,a'-dimercapto-p-xylene, glycol dimercapto acetate, butane-1,4-diol, hexane-1,6-diol, ethane dithiol, dodecane-1,12-diol, etc. Ethylene glycol and glycol dimercapto acetate are preferred.

THE DILUENTS

Preferably, the reaction between the diol, dithiol, or hydroxy thiol and the halogenated polymer will be performed in the presence of a diluent which serves to maintain a homogeneous reaction mixture, prevent frothing during the reaction and reduce the viscosity of the reaction mixture, thus facilitating the control of temperature, stirring, etc. Suitable diluents include $CCl_4$, mineral oils having a viscosity of from about 5 to 500 SUS at 100° F., e.g., 30 to 370 SUS at 100° F. Usually the diols, dithiols, and hydroxy thiols used will be insoluble in the diluent, although the product formed is generally oil soluble. Mechanical stirring of the reaction mixture during the reaction period is usually advantageous.

EXAMPLES

Examples 1 through 6 infra illustrate the preparation of the novel polymeric materials of the present invention and include a preferred embodiment. The exact configuration of the reaction product is not known with any degree of centainty but the results indicate that the halogenated polymers generally reacted with the diols, dithiols, and hydroxy thiols in mole ratios of from 25:1 to 1:1. More usually this mole ratio seems to be from 10:1 to 1.2:1, e.g., from about 2 to 4:1.

*Example 1*

Part A.—Gaseous chlorine was bubbled through 100 parts by weight of a commercially available polybutene having a molecular weight of about 830 diluted with 50 parts by weight of carbon tetrachloride. The temperature was maintained at 25° C. The halogen treatment was continued for about 2½ hours until 2 parts by weight of chlorine had been incorporated into the polybutene, based on the weight of the polybutene.

Part B.—One hundred fifty grams of the chlorinated polybutene/carbon tetrachloride mixture of Part A of this example was mixed with 5 grams of glycol dimercapto acetate. This mixture was heated to 190° C. (with stirring) and maintained at that temperature for 2 hours. During this period the $CCl_4$ was removed by evaporation. The reaction mixture was cooled. The polymeric product was an amber colored fluid having a mercaptan odor.

*Example 2*

Part A.—Chlorinated polybutene was prepared under ambient conditions by bubbling gaseous chlorine through 100 parts of polybutene diluted with 200 parts of a light mineral oil having a viscosity of 32 SUS at 100° F. The polybutene had a Staudinger molecular weight of about 830 prior to chlorination. Chlorination was continued until the reaction mixture contained 9.25 wt. percent chlorine. This corresponds to a calculated chlorine content of the polymer of about 21.8 wt. percent based on the weight of the chlorinated polymer.

Part B.—13.5 grams of the diluted chlorinated polybutene of Part A of this example was wixed with 1.5 grams (ca. 0.025 mole) of ethylene glycol. The mixture was heated to 90° C. (with stirring) and maintained at that temperature for 2 hours. Upon cooling, the reaction mixture was observed as a dark amber fluid.

*Example 3*

Part A.—A chlorinated polybutene was prepared by bubbling gaseous chlorine through 100 parts of polybutene diluted with 100 parts of a mineral oil having a viscosity of about 32 SUS at 100° F. The chlorination was continued for 5 hours. The polybutene had a Staudinger molecular weight of about 830. The resulting chlorinated polymer contained about 21.8 wt. percent chlorine, based on the weight of the polymer.

Part B.—25 grams of the dilute chlorinated polybutene of Part A of this example was mixed with 1.7 grams (ca 0.014 mole) of hexane-1,6-diol. The mixture was slowly heated to 154° C. (with stirring) and maintained at that temperature for one hour. The reaction mixture was cooled. The polymeric product recovered was a viscous, dark amber fluid.

*Example 4*

27 grams of the dilute chlorinated polybutene of Part A of Example 2 was mixed with 0.8 gram (ca. 0.005 mole) of a,a'-dimercapto p-xylene. The mixture was slowly heated to 92° C. (with stirring) and maintained at that temperature for one hour. The reaction mixture was cooled and the polymeric product recovered was a dark amber liquid having a distinctive mercaptan odor.

*Example 5*

Part A.—A chlorinated polybutene was prepared by bubbling chlorine gas through an undiluted polybutene (450 molecular weight) for several hours. The chlorinated product contained 7.08 wt. percent of chlorine based on the weight of the chlorinated polymer.

Part B.—100 grams (ca 0.2 mole) of the chlorinated polybutene of Part A of this example was mixed with 10 grams (ca. 0.05 mole) of glycol dimercaptoacetate. The mixture was heated to 92° C. (with stirring) and maintained at that temperature for 5 hours. The reaction mixture was cooled and the polymeric product thus recovered was a dark brown liquid with a mercaptan odor.

Example 6

2.5 grams of iodine monochloride was added, with mixing, to a mixture of 25 grams of polybutene (980 molecular weight) and 50 grams of a highly refined mineral oil having a viscosity of 32 SUS at 100° F. The mixture was stirred for 30 minutes at room temperature under a nitrogen atmosphere. An additional 48.7 grams of the mineral oil were added and the mixing continued for another 45 minutes. Then, as the reaction between the iodine monochloride and the polybutene appeared complete, 1.87 grams of ethylene glycol were added to the reaction mixture. The resulting mixture was slowly heated to 117° C. over a period of 2 hours. The net product was a dark purple viscous liquid.

Example 7

*Part A.*—A chlorinated polybutene was prepared from 125 grams of polybutene (molecular weight 830) diluted with 125 grams of a mineral oil having a viscosity of 32 SUS at 100° F. by bubbling chlorine gas through the mixture for two days. The product contained 23.5 wt. percent chlorine based on the weight of the chlorinated polymer.

*Part B.*—70 grams of the dilute chlorinated polybutene of Part A of this example were mixed with 2.7 grams of ethylene glycol. The mixture was heated to 108° C. (with stirring under a nitrogen atmosphere) and maintained at that temperature for six hours. The reaction mixture was cooled. The reaction mixture consisted of 2 phases. One phase consisted of about 1 gram of unreacted ethylene glycol. The other phase (the product) was a brown viscous liquid.

Example 8

*Part A.*—A chlorinated polybutene was prepared using the technique of Example 7, Part A. The chlorination was continued until the polymer contained 49 wt. percent chlorine based on the weight of the chlorinated polybutene.

*Part B.*—159 grams of the dilute chlorinated polybutene of Part A of this example were mixed with 4.5 grams ethylene glycol. The mixture was heated to 105° C. (with stirring) and maintained at that temperature for five hours. The reaction mixture was cooled. It consisted of two phases. One phase was about 2.4 grams of unreacted glycol. The other phase was the product which was a viscous black liquid.

LUBRICATING COMPOSITIONS CONTAINING THE NOVEL POLYMERIC MATERIALS

While many diols, dithiols, and hydroxy thiols are insoluble in oil, the polymeric materials of the present invention are generally soluble in oil and are particularly effective in reducing wear and enhancing the extreme pressure properties of the particular carrier medium in which they are incorporated. Compositions containing these polymeric materials are particularly suited for the lubrication of moving parts. In general, the novel polymeric materials of the present invention will be incorporated into the carrier medium in a concentration of from 0.01 to 10 wt. percent, e.g., .03 to 5 wt. percent. In some circumstances, it may be desirable to use higher concentrations, e.g., 30 wt. percent or more (these weight percents are based on the total weight of the lubricating composition).

For many of the ordinary applications of this invention, lubricating oils, cutting oils, metal working oils, hydraulic fluids, spindle oils, gear oils, greases and the like will be used as the lubricating or carrier medium for these novel lubricant additives.

Other additives can be present in the carrier medium or incorporated therein at a later time. These include corrosion inhibitors, wetting agents, thickeners, dispersants, dyes, neutral solvents, surface active agents, EP agents, anti-wear agents and the like.

The anti-wear properties of the compounds of the present invention were measured by first dissolving the novel lubricant additives in a white oil (Primol D) having a viscosity of about 325 SUS at 100° F. and a viscosity index of 78. Concentration of these lubricant additives in the lubricating oil is indicated opposite each test run.

The apparatus used for measuring the anti-wear properties of these materials was a ball and cylinder apparatus. The ball and cylinder apparatus employed was a rotating cylinder apparatus designed to measure the extent of metallic contact and friction between sliding lubricated surfaces. A complete description of the apparatus can be found in a paper entitled, "Metallic Contact and Friction between Sliding Surfaces," by M. J. Furey, presented at the 1960 Joint ASLE-ASME Lubrication Conference, October 19, 1960, in Boston, Massachusetts. This paper has been published by the American Society of Lubrication Engineers, 5 North Wabash Avenue, Chicago 2, Illinois, under the above-noted title in the ASLE Transactions, vol. 4, No. 1, pages 1–11, April, 1961.

Basically the apparatus consists of a fixed metal ball (½-inch dia.) loaded against a rotating steel cylinder (1¾-inch dia.). The extent of metallic contact is determined by passing an electric current through the ball and cylinder and measuring both the continuous and the average electric resistance between the contacting surfaces of the ball and cylinder. The extent of metallic contact is expressed as the percent of the time that metallic contact occurs in a given period of time and is thus a measure of wear, i.e., the less the contact, the less the wear. The apparatus can also be used to determine antifriction properties of lubricants. The use of this apparatus for testing will be referred to hereinafter as the Esso-Furey test.

The SAE machine is a well known test for determining the extreme pressure (EP) properties of lubricants. The SAE machine utilizes two rubbing member test cups, rotating against each other at different speeds. Thus the test surfaces are exposed to a sliding motion not unlike that experienced with hypoid or worm gears. The results are shown as the load (lbs.) that must be applied to cause a failure.

Table I, infra, illustrates the beneficial results in terms of reduced wear, i.e., percent metallic contact, and in terms of an increase in extreme pressure properties (SAE machine) that can be obtained by the use of the novel polymeric materials of the present invention. These data are shown in comparison with similar tests run on commercially available products.

*Table I.—Esso-Furey test*

CARRIER MEDIUM: PRIMOL D

ADDITIVE CONCENTRATION: 0.5 WT. PERCENT

|  | Percent Metallic Contact @ 32 minutes | | | SAE Machine Failure Load, lbs. |
|---|---|---|---|---|
| Speed, RPM | 480 | 240 | 480 | 1,000 |
| Load, grams | 960 | 960 | 4,000 |  |
| Additive: |  |  |  |  |
| 1. Anglamol 50 | 19.1 | 59.4 | 100.0 |  |
| 2. Lubrizol 1060 | 44.0 | 98.5 | 94.6 |  |
| 3. Example 1 | 0 | 1.4 | 2.4 |  |
| 4. Example 2 | 2.9 | 16.6 | 81.0 |  |
| 5. Example 3 | 1.1 | 2.2 | 74.2 |  |
| 6. Example 4 | 10.5 | 44.6 | 85.7 |  |
| 7. Example 5 | 1.1 | 0 | 0 |  |
| 8. Example 6 | 44.9 | 35.0 | 98.7 |  |
| 9. Example 7 |  |  |  | 4,200. |
| 10. Example 8 |  |  |  | Beyond limit of tester. |
| 11. Parapoid 10-C |  |  |  | 3,750. |

From Table I it can be seen that the products of the present invention compare very favorably (in terms of antiwear properties) with two commercially available additives (Anglamol 50 and Lubrizol 1060) when used in the same concentrations. Note the particularly outstanding performance of Examples 1 and 5. Anglamol 50 is a chlorinated wax type additive containing about 50 wt. percent chlorine. Lubrizol 1060 is a zinc dialkyl (ca. $C_4$–$C_6$) dithiophosphate additive. Both are sold by the Lubrizol Corporation, Wycliffe, Ohio.

Examples 7 and 8 compare favorably with Parapoid 10-C when tested in the SAE machine for extreme pressure properties. Parapoid 10-C is a sulfurized, chlorinated wax/kerosene mixture sold by Enjay Chemical Co., New York, New York.

Tables II and III, infra, illustrate the beneficial effects obtained by using low concentrations of a dithiol type polymeric material of the present invention. It can be seen that this material is particularly effective at the low concentrations and is far superior to conventional anti-wear additives, even when the convntional additives are used at higher concentrations.

*Table II.—Esso-Furey test*

CARRIER MEDIUM: PRIMOL D

| Additive | Concentration, wt. percent | Percent Metallic Contact after 1 min. | | |
|---|---|---|---|---|
| | | Speed 240 Load 960 | Speed 480 Load 960 | Speed 480 Load 4,000 |
| Lubrizol 1060 | 10.0 | 81.8 | 80.0 | 66.3 |
| XP-118-2* | 0.1 | 4.2 | 6.2 | 0.9 |
| XP-118-2 | 0.2 | 15.4 | 3.6 | 1.6 |

*XP-118-2 is the condensation product of chlorinated polybutene and glycol dimercapto acetate (see Example 1).

*Table III.—Esso-Furey test*

CARRIER MEDIUM: PRIMOL D

| Additive | Concentration, wt. percent | Percent Metallic Contact after 32 min. | | |
|---|---|---|---|---|
| | | Speed 240 Load 960 | Speed 480 Load 960 | Speed 480 Load 4,000 |
| Lubrizol 1060 | 10.0 | 0.8 | 4.0 | 21.3 |
| XP-118-2 | 0.1 | 0.2 | 0 | 0 |
| XP-118-2 | 0.2 | 0 | 0 | 0 |

While the present invention has been described with a certain degree of particularity, it is to be realized that various additional modifications and adaptations can be made within the spirit and scope of the invention as hereinafter claimed.

What is claimed is:

1. A lubricating oil composition comprising a mineral oil and between about 0.01 and about 10.0 wt. percent of the total composition of a polymeric material prepared by reacting a compound (1) having a formula: H—X—R—Y—H, wherein X and Y each are selected from the group consisting of sulfur and oxygen, and R is selected from the group consisting of alkylene, arylene, cycloalkylene, and —$CH_2COOCH_2CH_2OOCCH_2$—, said R containing between about 2 and about 60 carbon atoms, with a halogenated polymer (2) prepared by reacting oil soluble polymer (3) having a Staudinger molecular weight of between about 100 and about 500,000 and selected from the group consisting of homopolymers of mono-olefins, homopolymers of diolefins, homopolymers of ethylenically unsaturated mono-carboxylic acid alkylesters, homopolymers of alkyl esters of alpha, beta unsaturated dicarboxylic acids, copolymers of mono-olefins with mono-olefins having a different number of carbon atoms from the other mono-olefin reactant, copolymers of mono-olefins with diolefins and copolymers of mono-olefins with vinyl-containing aromatic compounds, copolymers of mono-olefins with the aforementioned unsaturated carboxylic acid alkyl esters, homopolymers of vinyl ethers and homopolymers of vinyl carboxylic acid esters, with a halogenating agent (4); the reaction of (1) with (2) being carried out at a temperature of between about 25° and about 250° C. and the mol ratio of said reactants (1) and (2) being between about 0.1 to 1.0 and about 1.4 to 1.0.

2. A lubricating oil composition as in claim 1 wherein compound (1) is a diol.

3. A lubricating oil composition as in claim 1 wherein compound (1) is a dithiol.

4. A lubricating oil composition as in claim 1 wherein polymer (2) is a halogenated polybutene having a molecular weight of between about 200 and about 25,000.

5. A lubricating oil composition as in claim 4 wherein compound (1) is a diol.

6. A lubricating oil composition as in claim 4 wherein compound (1) is a dithiol.

7. A lubricating oil composition as in claim 4 wherein compound (1) is glycol dimercapto acetate and compound (2) is chlorinated polybutene having a molecular weight of between about 400 and about 1,200.

References Cited by the Examiner

UNITED STATES PATENTS

| 2,664,173 | 12/1953 | Karig | 252—58 |
|---|---|---|---|
| 2,695,880 | 11/1954 | Benning et al. | 252—58 |
| 2,911,392 | 11/1959 | Brooks et al. | 260—79.6 |
| 3,030,345 | 4/1962 | Rottig et al. | 260—79.5 |
| 3,052,657 | 9/1962 | Calhoun et al. | 252—48.6 |
| 3,102,863 | 9/1963 | Herbert et al. | 252—48.6 |
| 3,206,400 | 9/1965 | Flowers | 252—48.6 |

DANIEL E. WYMAN, *Primary Examiner.*

JOSEPH L. SCHOFER, *Examiner.*

L. EDELMAN, L. G. XIARHOS, *Assistant Examiners.*